(12) United States Patent
Takayama et al.

(10) Patent No.: US 7,602,431 B2
(45) Date of Patent: Oct. 13, 2009

(54) SOLID-STATE IMAGING ELEMENT AND SOLID-STATE IMAGING APPARATUS

(75) Inventors: Masaaki Takayama, Fukuoka (JP); Hiroaki Tanaka, Fukuoka (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 11/533,616

(22) Filed: Sep. 20, 2006

(65) Prior Publication Data

US 2007/0070232 A1    Mar. 29, 2007

(30) Foreign Application Priority Data

Sep. 28, 2005   (JP) .............................. 2005-281847

(51) Int. Cl.
*H04N 3/14*      (2006.01)
*H04N 5/335*     (2006.01)
(52) U.S. Cl. ..................... 348/315; 348/279; 348/280; 348/283; 348/319; 348/321
(58) Field of Classification Search ............... 348/317, 348/319–323; 358/482–483, 513–514
See application file for complete search history.

(56) References Cited

U.S. PATENT DOCUMENTS

| | | | | |
|---|---|---|---|---|
| 4,553,167 A | * | 11/1985 | Kinoshita | .................... 348/318 |
| 4,816,916 A | * | 3/1989 | Akiyama | .................... 348/317 |
| 4,870,495 A | * | 9/1989 | Kinoshita et al. | ........... 348/264 |
| 5,053,873 A | * | 10/1991 | Taniji | .......................... 348/243 |
| 5,075,747 A | * | 12/1991 | Kanbe | .......................... 257/236 |
| 5,274,476 A | * | 12/1993 | Lee | ............................. 358/483 |
| 5,308,970 A | * | 5/1994 | Pool | ........................ 250/208.1 |
| 5,400,071 A | * | 3/1995 | Yamada | .......................... 348/316 |
| 5,969,759 A | * | 10/1999 | Morimoto | ................... 348/311 |
| 7,480,000 B2 | * | 1/2009 | Oda | ............................. 348/321 |

FOREIGN PATENT DOCUMENTS

| JP | 64-089863 | 4/1989 |
|---|---|---|
| JP | 08-125158 | 5/1996 |

* cited by examiner

*Primary Examiner*—Ngoc-Yen T Vu
(74) *Attorney, Agent, or Firm*—Sonnenschein Nath & Rosenthal LLP

(57) ABSTRACT

A solid-state imaging element includes: a plurality of light receiving elements provided within an imaging region on a semiconductor substrate; a color filter with a plurality of colors provided on the plurality of light receiving elements for filtering with a predetermined color; a vertical shift register disposed adjacent to the light receiving elements for transferring a charge from the light receiving elements; and a first horizontal shift register and a second shift register disposed interposing the imaging region therebetween for transferring a charge transferred from the vertical shift register and outputting a signal in accordance with the charge, respectively; wherein a respective charge of the light receiving elements accumulated therein in accordance with a light transmitted through filters of the same color in the color filter is transferred exclusively via either one of the first horizontal shift register or the second horizontal shift register to be outputted as the signal.

4 Claims, 10 Drawing Sheets

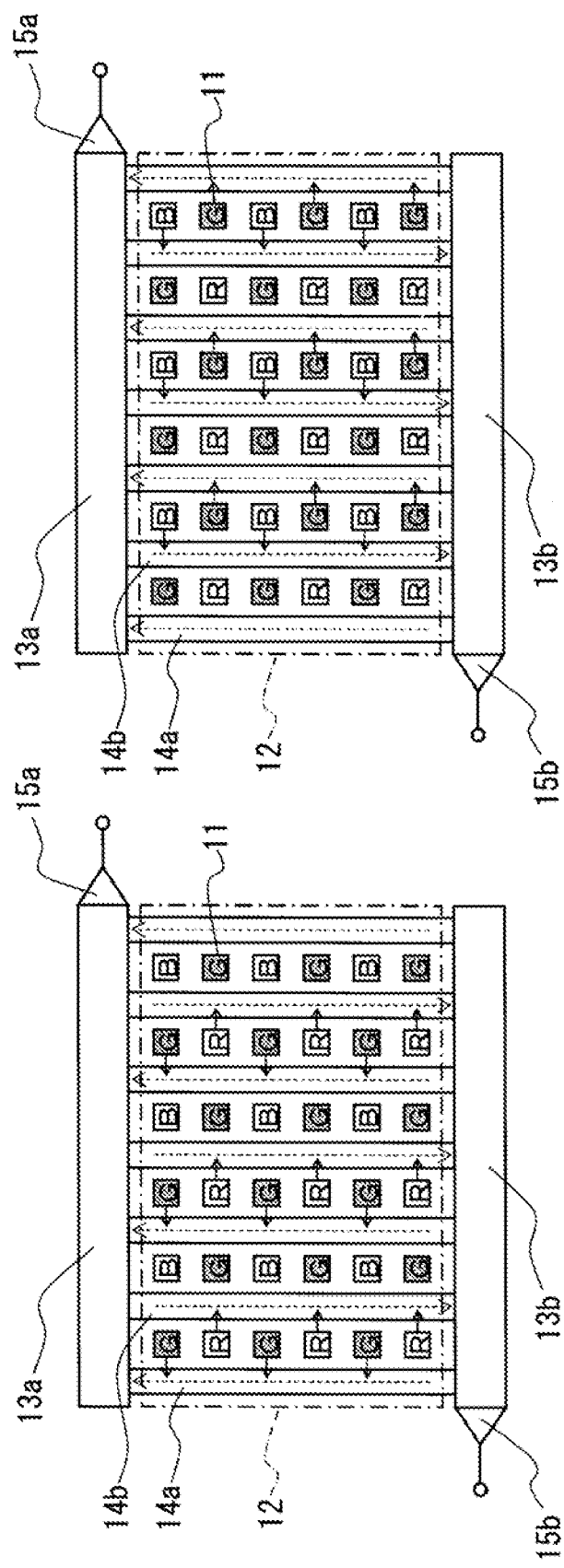

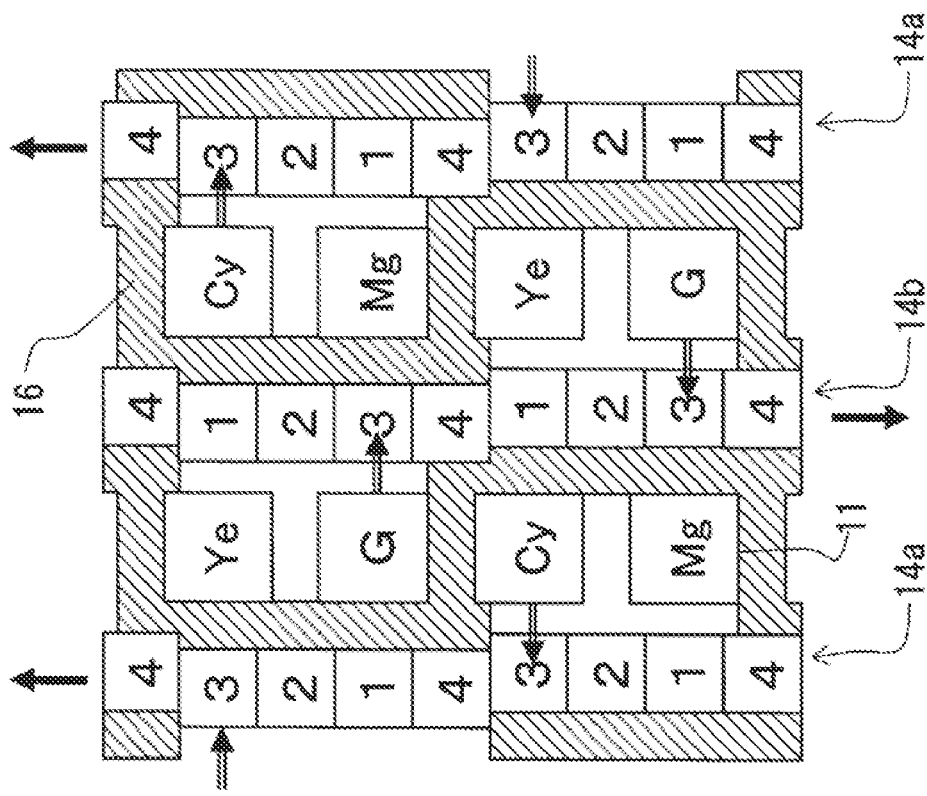

SOLID-STATE IMAGING ELEMENT AND SOLID-STATE IMAGING APPARATUS

CROSS REFERENCES TO RELATED APPLICATIONS

The present application claims the benefit of priority to Japanese Patent Application JP 2005-281847 filed in the Japanese Patent Office on Sep. 28, 2005, which is incorporated herein to the extent permitted by law.

BACKGROUND OF THE INVENTION

1. Field of the Invention

The present invention relates to a solid-state imaging element and a solid-state imaging apparatus, and, in particular, it relates to a Charge-Coupled Device (CCD) type solid-state imaging element and a solid-state imaging apparatus provided with at least two or more charge transfer horizontal shift registers.

2. Related Art

A conventional CCD type solid-state imaging element is generally composed of a plurality of light receiving elements which are arrayed in vertical and horizontal directions on a semiconductor substrate, a plurality of charge transfer vertical shift registers which are arranged adjacent to each of these light receiving elements, and charge transfer horizontal shift registers which are juxtaposed to one end of each of these charge transfer vertical shift registers, and whereby a charge accumulated in each light receiving element in accordance with an incident light is transferred via the vertical shift registers and the horizontal shift registers.

An output amplification circuit is provided at one end of each of the charge transfer horizontal shift registers. The output amplification circuit, which is operable to output a voltage corresponding to a quantity of charge transferred, outputs information of a quantity of charge accumulated in each light receiving element as a voltage signal.

As there is a need for further improvements in functions and operability of a solid-state imaging apparatus provided with such a solid-state imaging element as described above, demands for higher mega-pixels and higher frame rates are increasing for this solid-state imaging element for use in the solid-state imaging apparatus.

In particular, in the case where the solid-state imaging element is made to have enhanced mega-pixels, its frame rate decreases due to an increased number of light receiving elements formed on a semiconductor substrate, thereby impairing the ease of use and operability of the solid-state imaging apparatus since it becomes difficult to shorten imaging intervals, and an upper limit of continuous imaging is suppressed and so on.

Therefore, nowadays, in order to enhance pixel-multiplication of the solid-state imaging elements and at the same time to improve the frame rate, there are attempted for the solid-state element to increase its drive frequency and/or to pluralize output channels of signals to be outputted from the horizontal shift register.

In the case of pluralizing the output channels, charge transfer horizontal shift registers may be provided in a plurality of numbers. More specifically, as shown in FIG. 10, it is practiced that a first horizontal shift register 300a and a second horizontal shift register 300b are disposed facing each other, and interposing therebetween an imaging region 200 in which a plurality of light receiving elements 100 are arrayed in a grid. Refer, for example, to a Japanese Patent Application Publication No. 1996-125158.

A charge transfer vertical shift register which is disposed adjacent to the light receiving elements 100 for transferring a charge accumulated in a light receiving element 100 to a first horizontal shift register 300a or to a second horizontal shift register 300b is provided as many numbers as required within an imaging region 200. And, in particular, in the solid-state imaging element shown in FIG. 10, a first vertical shift register 400a for transferring a charge to the first horizontal shift register 300a and a second vertical shift register 300b for transferring a charge to a second horizontal shift register 300b are disposed alternately.

By arranging as described above so that a signal is enabled to be output from the first horizontal shift register 300a and the second horizontal shift register 300b, the frame rate can be improved. In FIG. 10, 500a denotes a first output amplification circuit provided at one end of the first horizontal shift register 300a, and 500b denotes a second output amplification circuit provided at one end of the second horizontal shift register 300b.

SUMMARY OF THE INVENTION

Over the solid-state imaging element described above, in most cases, a color filter is mounted. The color filter is composed by arranging a monochrome filter of respective colors on each light receiving element. In the case of a so-called RGB primary color, consisting of three colors of red (R), green (G) and blue (B), a monochrome filter having either one of these three colors is disposed thereon.

In FIG. 10, the color of a filter arrayed on each light receiving element is denoted by "R", "G" and "B", wherein "R" denotes that its portion is a red filter, "G" denotes its portion is a green filter, and "B" denotes its portion is a blue filter. By way of example, the color filter of FIG. 10 show a color filter configuration of a Bayer array (checkered pattern arrangement) which is widely used in conventional RGB primary color filters.

The color filter is composed by arranging in repetition a basic unit having respective color filters disposed in a predetermined pattern. In particular, in a color filter of the Bayer array, the basic unit for a repeat pattern is composed of four filters arrayed in 2 by 2 rows and columns; two green color filters disposed diagonally on one way, one red color filter and one blue color filter disposed diagonally on the other way. In the case where the first vertical shift register and the second vertical shift register are disposed alternately as described above, when considering respective quantities of charges at the two green color filters, a charge which was accumulated in one of the light receiving elements thereof and a charge which was accumulated in the other one of the light receiving elements thereof are arranged to be transferred via the first horizontal shift register and the second horizontal shift registers, respectively, so as to be converted to respective signals and outputted separately.

Therefore, there was a problem that an uncertain output characteristic difference resulted in between a signal outputted from the first horizontal shift register and a signal outputted from the second horizontal shift register due to additions of respective influences of a process variation in the first output amplification circuit provided at the first horizontal shift register and the influence of a process variation in the second output amplification circuit provided at the second horizontal shift register. As to this output characteristic, there may be contained an output characteristic of the amplification circuits, linearity of output, any noise superimposed on the output and the like. In this characteristic, respective characteristics of the vertical shift register, the horizontal shift register and the output circuit are superimposed.

It is possible for signals differing in filter colors from each other to compensate for the output characteristic difference by an output characteristic compensation processing per color in a separate circuit at the time of generating an image data signal using these signals. However, in the case of the same color as the green color filters, because the same colors are compared simultaneously and visually, there was a problem that an output characteristic difference becomes more conspicuous thereby degrading image quality.

Therefore, a solid-state imaging element contemplated according to an embodiment of the present invention includes a plurality of light receiving elements mounted within an imaging region on a semiconductor substrate; a color filter with a plurality of colors provided on the plurality of light receiving elements for filtering with a predetermined color; charge transfer vertical shift registers disposed adjacent to each of the plurality of the light receiving elements for transferring charges from the light receiving elements; and a first charge transfer horizontal shift register and a second charge transfer horizontal shift register, disposed so as to sandwich the imaging area, for transferring respective charges transferred from respective vertical shift registers, and outputting signals based on these charges, respectively, wherein respective charges in respective light receiving elements accumulated therein in accordance with light transmitted through filters of the same color in the color filter are allowed to be transferred exclusively via either one of the first horizontal shift register or the second horizontal shift register, and outputted as respective signals.

Further, the color filter has a configuration where it is constructed by arranging a basic unit in repetition in which respective monochromic color filters are disposed in a predetermined pattern, and also that two or more filters of the same color are arranged in the basic unit. Here, the basic unit has a Bayer array, and the color referred to as the same color is green.

Still further, a solid-state imaging apparatus according to one embodiment of the present invention, provided with a solid-state imaging element which includes a plurality of light receiving elements mounted within an imaging region on a semiconductor substrate; a color filter with a plurality of colors mounted on the plurality of the light receiving elements for filtering with a predetermined color; charge transfer vertical shift registers disposed adjacent to each of the light receiving elements for transferring charges from the light receiving elements; and a first charge transfer horizontal shift register and a second charge transfer horizontal shift register disposed so as to sandwich the imaging region, for transferring charges transferred from the vertical shift registers, respectively, and outputting respective signals based on these charges, wherein a solid-state imaging element thereof transfers respective charges of the plurality of light receiving elements accumulated therein in accordance with respective light transmitted through filters of the same color in the color filter exclusively via either one of the first horizontal shift register or the second horizontal shift register and outputs as respective signals.

According to the present invention, it is enabled for respective charges accumulated in respective light receiving elements in accordance with the light transmitted through filters of the same color to be transferred exclusively via either one of the first horizontal shift register or the second horizontal shift register to be outputted as respective signals, thereby ensuring for respective charges in respective light receiving elements accumulated therein in accordance with the light transmitted through the filters of the same color to be transferred via the same horizontal shift register, so that the occurrence of an output characteristic difference can be prevented in the signals with the same color.

In a solid-state imaging element and a solid-state imaging apparatus provided with this solid-state imaging element according to the present invention, the solid-state imaging element is constructed by forming a plurality of light receiving elements, charge transfer vertical shift registers and charge transfer horizontal shift registers, respectively, in a predetermined position on a semiconductor substrate, and also by forming a color filter including a plurality of filters of a plurality of colors thereon, wherein, in particular, as the horizontal shift registers, a first horizontal shift register and a second horizontal shift register are formed in a manner to interpose a light receiving region in which the plurality of light receiving elements are formed.

Then, in the solid-state imaging element, respective charges in the plurality of light receiving elements accumulated therein in accordance with respective light transmitted through filters of the same color in the color filter are allowed to be transferred exclusively via either one of the first horizontal shift register or the second horizontal shift register and to be outputted as a signal.

By the arrangement described above so that respective charges accumulated in respective light receiving elements in accordance with the light passed through the filters of the same color in the color filter are allowed to be transferred via the same horizontal shift register and outputted as a signal, it becomes possible to prevent, in principle, the influence of an output characteristic difference to occur between an output amplification circuit of the first horizontal shift register and an output amplification circuit of the second horizontal shift register at least in the signals of the same color.

In the description hereinafter, for the sake of simplicity, "a charge in the plurality of light receiving elements accumulated respectively in accordance with the light passed through the filters of the same color in the color filter" will be referred to as "a signal charge".

According to an embodiment of the invention, by successful elimination of the influence due to the output characteristic difference in signals of the same color, when generating a predetermined image data signal from these signals, it is able to compensate for an output characteristic difference between the output amplification circuit of the first horizontal shift register and the output amplification circuit of the second horizontal shift register, simply by a gain control processing such as a white balance or the like, thereby preventing a noise occurrence in the image data signal.

In addition, as it becomes possible to eliminate a compensation signal processing for correcting the output characteristic difference, which was conventionally required, production efficiency of the solid-state imaging element and the solid-state imaging apparatus can be improved.

BRIEF DESCRIPTION OF THE DRAWINGS

Other features and advantages of the present invention will be apparent from the following description taken in connection with accompanying drawings wherein:

FIGS. 2A and 2B are schematic diagrams showing a solid-state imaging element according to the embodiment of the invention, in which FIG. 2A shows a readout condition in a first field, while FIG. 2B shows a readout condition in a second field;

FIGS. 3A and 3B are schematic diagrams showing a solid-state imaging element according to the embodiment of the invention more in detail, in which FIG. 3A shows a readout condition in the first field while FIG. 3B shows a readout condition in the second field;

FIGS. 8A and 8B are schematic diagrams showing another example of the 2 by 4 complementary color filter;

DESCRIPTION OF THE PREFERRED EMBODIMENTS

Figure 1:
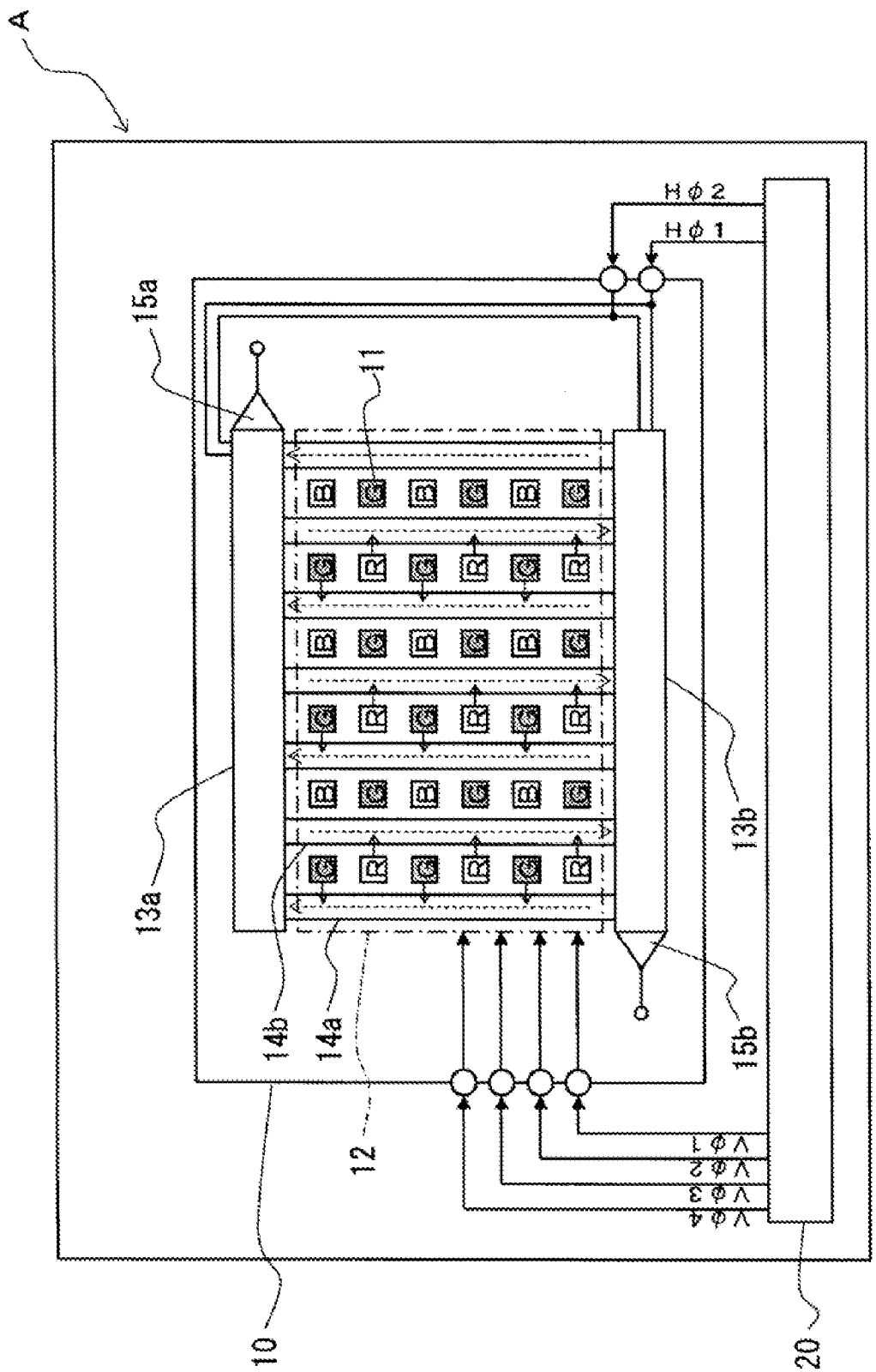
FIG. 1 is a schematic block diagram of a solid-state imaging apparatus according to an embodiment of the invention.

By referring to the accompanying drawings, preferred embodiments of the present invention will be described in detail in the following. FIG. 1 is a schematic block diagram showing a solid-state imaging apparatus A according to an embodiment of the present invention. The solid-state imaging apparatus A is a digital still camera or what is called a digital camera. However, it is not limited to the digital still camera, and may include a digital video camera, a camera unit built in a portable telephone and the like.

FIG. 1 shows a solid-state imaging element 10 for use of imaging in a solid-state imaging apparatus A, and a timing generator 20 for generating a drive signal for driving this solid-state imaging element 10 at a predetermined timing. In addition, in the solid-state imaging apparatus A, there are provided a power source such as a battery, a memory for storing image data signals, a controller for controlling the solid-state imaging apparatus A and the like. Although a circuitry configuring the above-mentioned components is given in a separate circuit (as a chip other than the solid-state imaging element 10) in FIG. 1, it may be incorporated on the same chip, or may be provided separately on plural chips. By way of example, the solid-state imaging element 10 according to the embodiment of the present invention will be described as a CCD solid-state imaging apparatus of the interlace method.

The solid-state imaging element 10 is composed of a semiconductor substrate, on this semiconductor substrate, there are provided a plurality of light receiving elements 11 consisting of photo diodes arrayed vertically and horizontally at a predetermined distance, a first horizontal shift register 13a and a second horizontal shift register 13b disposed in a manner to interpose an imaging region 12 in which a plurality of light receiving elements 11 are arrayed, a first vertical shift register 14a disposed along one side of a row of light receiving elements 11 disposed in vertical directions, and a second vertical shift register 14b disposed along the other side of the row of light receiving elements 11.

Further, over the semiconductor substrate, a color filter is provided. According to the embodiment of the present invention, the color filter is composed of a so-called 2 by 2 primary color filter having a Bayer array, in which green color filters are arranged in a checkered pattern. For convenience of description, respective colors of filters mounted on each of the light receiving elements 11 are denoted by "R", "G" and "B", where "R" denotes that a red color filter is provided, "G" denotes that a green color filter is provided, and "B" denotes that a blue color filter is provided.

As to the horizontal transfer, in this embodiment of the present invention, the horizontal transfer therein uses a well-known two phase drive method. Two phases of a drive signal are denoted by a first horizontal drive signal H$\phi$1 and a second horizontal drive signal H$\phi$2, respectively, which are supplied to both of the first horizontal shift register 13a and the second horizontal shift register 13b, for application to enable charge transfer.

In particular, the first horizontal shift register 13a and the second horizontal shift register 13b are disposed opposite to each other so as to interpose the imaging region 12 in which a plurality of light receiving elements 11 are mounted, then in response to a first horizontal drive signal H$\phi$1 and a second horizontal drive signal H$\phi$2 supplied from a timing generator 20, the first horizontal shift register 13a transfers a signal charge in a direction from the left-hand side to the right-hand side in FIG. 1, while the second horizontal shift register 13b transfers a signal charge in a direction from the right-hand side to the left-hand side in FIG. 1.

At one ends of the first horizontal shift register 13a and the second horizontal shift register 13b, there are provided a first output amplification circuit 15a and a second output amplification circuit 15b, respectively. By means of the first output amplification circuit 15a and the second output amplification circuit 15b, and in response to a signal charge transferred thereto, a predetermined voltage signal is generated and outputted therefrom, respectively.

In the following description of the embodiment of the present invention, the first horizontal shift register 13a is inclusive of the first output amplification circuit 15a, and the second horizontal shift register 13b is inclusive of the second output amplification circuit 15b.

The first vertical shift register 14a is provided on one side of a column of light receiving elements 11 disposed in vertical directions in FIG. 1, and the second vertical shift register 14b is provided on the other side thereof. The first vertical shift register 14a and the second vertical shift register 14b are disposed alternately in the imaging region 12 interposing each column of light receiving elements 11.

The first vertical shift register 14a and the second vertical shift register 14b are arranged to be driven in response to a first vertical drive signal V$\phi$1, a second vertical drive signal V$\phi$2, a third vertical drive signal V$\phi$3, and a fourth vertical drive signal V$\phi$4 supplied from a timing generator 20. The first vertical shift register 14a is operable to transfer a signal charge from the bottom to the upper direction in FIG. 1 for enabling the signal charge to be read out by the first horizontal shift register 13a, and the second vertical shift register 14b is operable to transfer a signal charge from the upper to the bottom direction in FIG. 1 for enabling the signal charge to be read out by the second horizontal shift register 13b.

When reading out image data imaged in the solid-state imaging element 10 constructed as described above, as a first field, signal charges are read out and transferred from light receiving elements 11 in odd-numbered columns in the imaging region 12 shown in FIG. 1, subsequently, as a second field, signal charges are read out and transferred from light receiving elements 11 in even-numbered columns in the imaging region 12.

Here, according to the embodiment of the present invention, as shown in FIG. 2A, when reading signal charges in the first field from light receiving elements 11 in odd numbered columns, a signal charge from a light receiving element 11 provided with a green color filter is read out to the first vertical shift register 14a, and a signal charge from a light receiving element 11 provided with a red color filter is read out to the second vertical shift register 14b.

The signal charge read out by the first vertical shift register 14a is transferred to the first horizontal shift register 13a, to be output from the first horizontal shift register 13a as a first green color signal. Further, the signal charge read out by the second vertical shift register 14b is transferred to the second horizontal shift register 13b to be output therefrom as a red color signal.

Subsequently, when reading out signal charges in the second field from light-receiving elements 11 in even-numbered columns in the imaging region 12, a signal charge from a light receiving element 11 provided with a green color filter is read out by a first vertical shift register 14a, and a signal charge from a light receiving element 11 provided with a blue color filter is read out by a second vertical shift register 14b.

The signal charge read out by the first vertical shift register 14a is transferred to the first horizontal shift register 13a to be output therefrom as a second green color signal. Further, the signal charge read out by the second vertical shift register 14b is transferred to the second horizontal shift register 13b to be output therefrom as a blue color signal.

As described hereinabove, the first green color signal read out in the first field and the second green color signal read out in the second field are transferred exclusively via first vertical shift registers, respectively, to be output from the first horizontal shift register 13a, thereby enabling to eliminate an output characteristic difference between the first green color signal and the second green color signal, and produce a high quality image data signal.

Figure 3A:
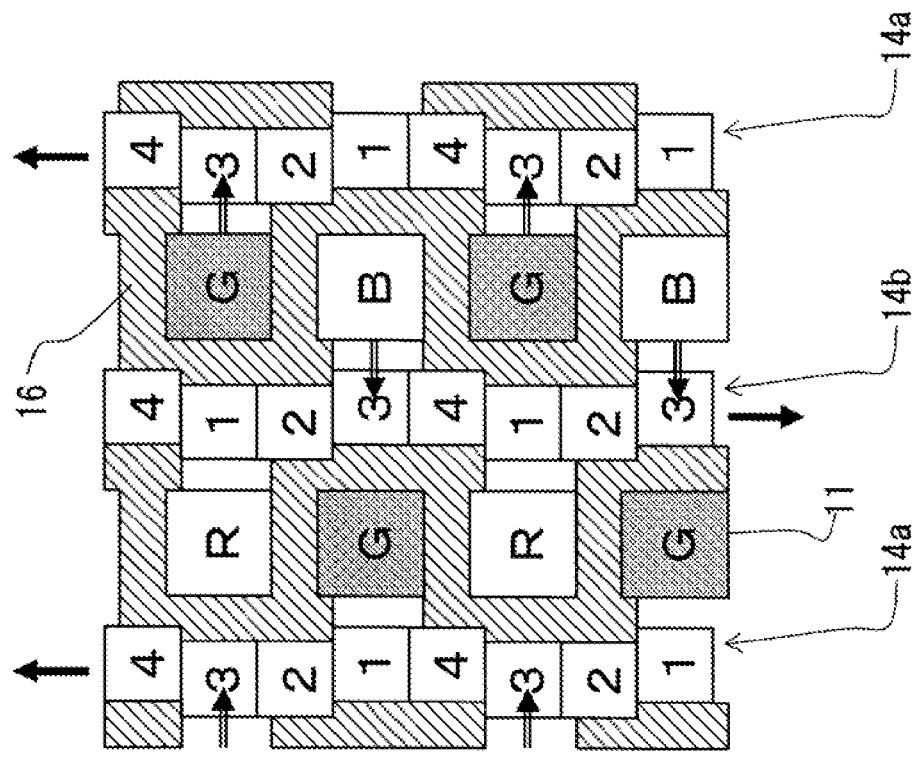
Figure 3B:
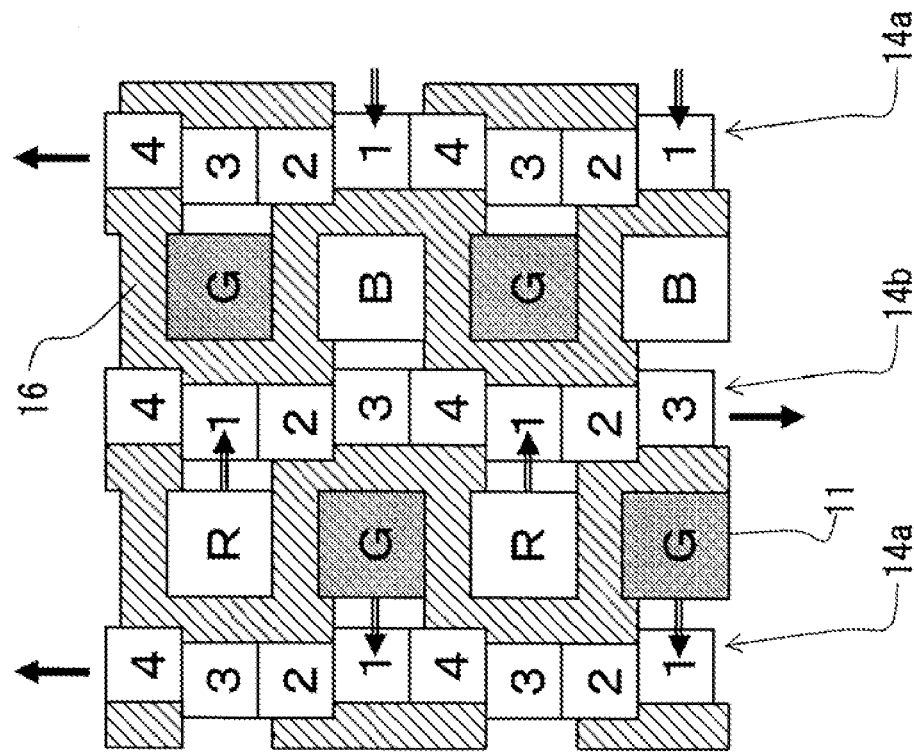

As described above, because that in the first field, signal charges of the light receiving elements 11 provided with the green filter are read out to the first vertical shift register 14a while signal charges of the light receiving element 11 provided with the red filter are read out to the second vertical shift register 14b, and also that in the second field, signal charges of the light receiving elements 11 provided with the green filter are read out to the first vertical shift register 14a while signal charges of the light receiving elements 11 provided with the blue filter are read out to the second vertical shift register 14b, as shown in FIGS. 3A and 3B, respective light receiving elements 11 are adjusted with respect to the directions of readout of signal charges.

For the light receiving elements 11 provided with a green filter, a channel stop 16 is provided on the side of the second vertical shift register 14b opposite to the first vertical shift register 14a, while for the light receiving elements 11 provided with the red filter and the blue filter, a channel stop 16 is provided on the side of each of the first vertical shift registers 14a opposite to the second vertical shift register 14b, so that the directions of transfer of the signal charges are controlled by this channel stop 16 to ensure for the signal charges to be read either by a predetermined first vertical shift register 14a or a predetermined second vertical shift register 14b.

As shown in FIGS. 3A and 3B, a channel stop 16 provided in a staggered pattern on both sides of the vertical shift register is connected not to be isolated electrically between a predetermined pixel while it is arranged in the staggered pattern, thereby ensuring to perform the function of a conventional channel stop. That is, for the channel stop 16, it is ensured not to impair the functions thereof to suppress a difference of potentials between an edge portion and a center portion on the surface of the substrate in the imaging region by applying a preset potential (presently, a ground potential is widely used), and suppress a noise by disposing holes generated in the light receiving elements or in the vertical registers to a preset potential.

With reference to FIGS. 3A and 3B, "1", "2", "3" and "4" shown in the columns of the first vertical register 14a and the second vertical shift register 14b, denote respective registers to which a bias of a first vertical drive signal V$\phi$1, a second vertical drive signal V$\phi$2, a third vertical drive signal V$\phi$3, and a fourth vertical drive signal V$\phi$4 is applied, respectively. In the first field, a readout potential is formed by applying a readout voltage to the electrode of "1" register portion, so as to read out a signal charge from a light receiving element 11 provided with a green filter to a first vertical shift register 14a, at the same time to read out a signal charge from a light receiving element 11 provided with a red filter to a second vertical shift register 14b. In the second field, a readout potential is formed by applying a readout voltage to the electrode of a "3" register portion, so as to read out a signal charge from a light receiving element 11 provided with a green filter to a first vertical shift register 14a, and at the same time to read out a signal charge from a light receiving element 11 provided with a blue filter to a second vertical shift register 14b.

Respective electrodes to which each of the first vertical drive signal V$\phi$1, the second vertical drive signal V$\phi$2, the third vertical drive signal V$\phi$3 and the fourth vertical drive signal V$\phi$4 is applied are formed in such a manner as will be described in the following.

Figure 4A:
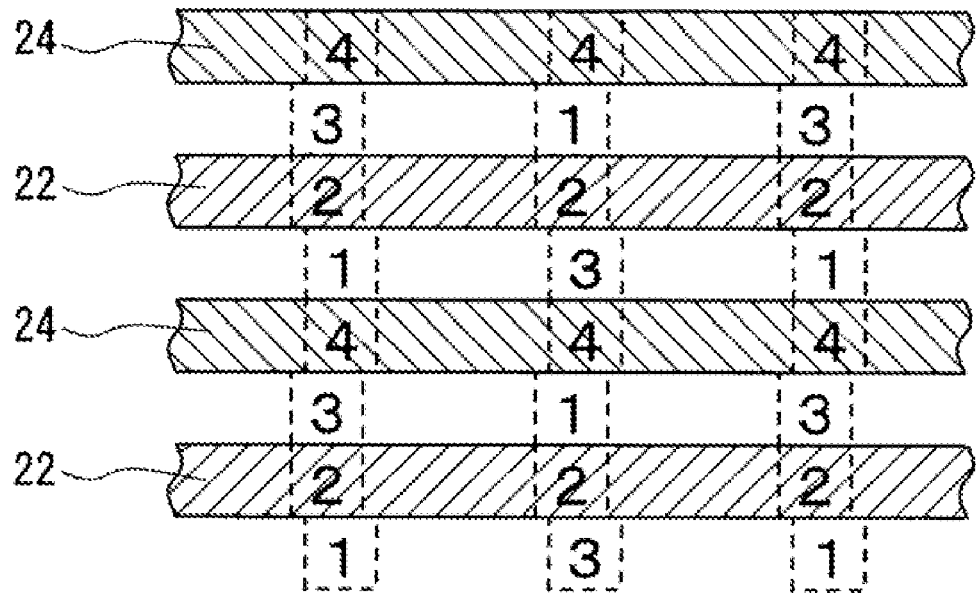
FIGS. 4A and 4B are schematic diagrams showing a method of forming respective electrodes for vertical charge transfer.

With reference to FIG. 4A, first of all, on a semiconductor substrate, a second electrode 22 is formed to cover a portion "2" of a vertical register, and also a fourth electrode 24 is formed to cover a portion "4" of the vertical register. In particular, the second electrode 22 and the fourth electrode 24 are formed in a continuous linear pattern extending in the horizontal directions as shown in FIG. 4A so as to be able to apply a vertical drive signal applied from a bus line provided outside the pixel region, which is not shown, in the horizontal directions in FIG. 4A.

Figure 4B:
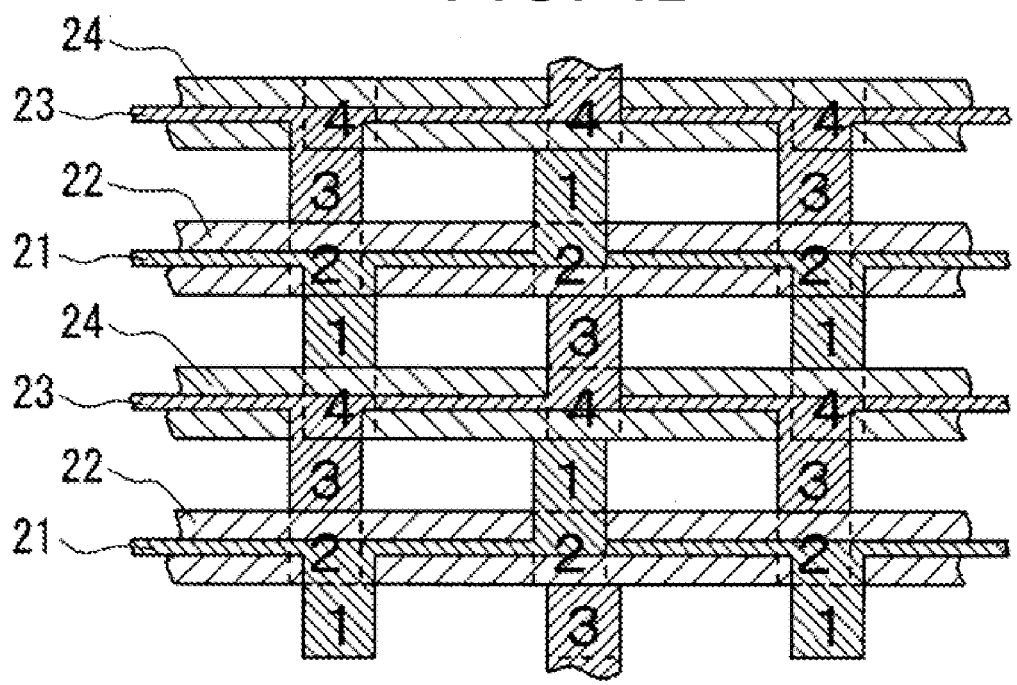

Then, as shown in FIG. 4B, on the second electrode 22, a first electrode 21 is formed linearly likewise the second electrode 22, and also, on the fourth electrode 24, a third electrode 23 is formed linearly likewise the fourth electrode 24.

In particular, the first electrode 21 is formed narrower than the second electrode 22 and to have protrusions projecting in orthogonal directions so as to cover each portion "1" of the vertical register. The third electrode 23 is formed narrower than the fourth electrode 24 and to have protrusions projecting in orthogonal directions so as to cover each portion "3" of the vertical register.

Then, on the first electrode 21, second electrode 22, third electrode 23 and fourth electrode 24, a semiconductor layer to serve as a first vertical shift register 14a and a second vertical shift register 14b is formed.

Figure 5:
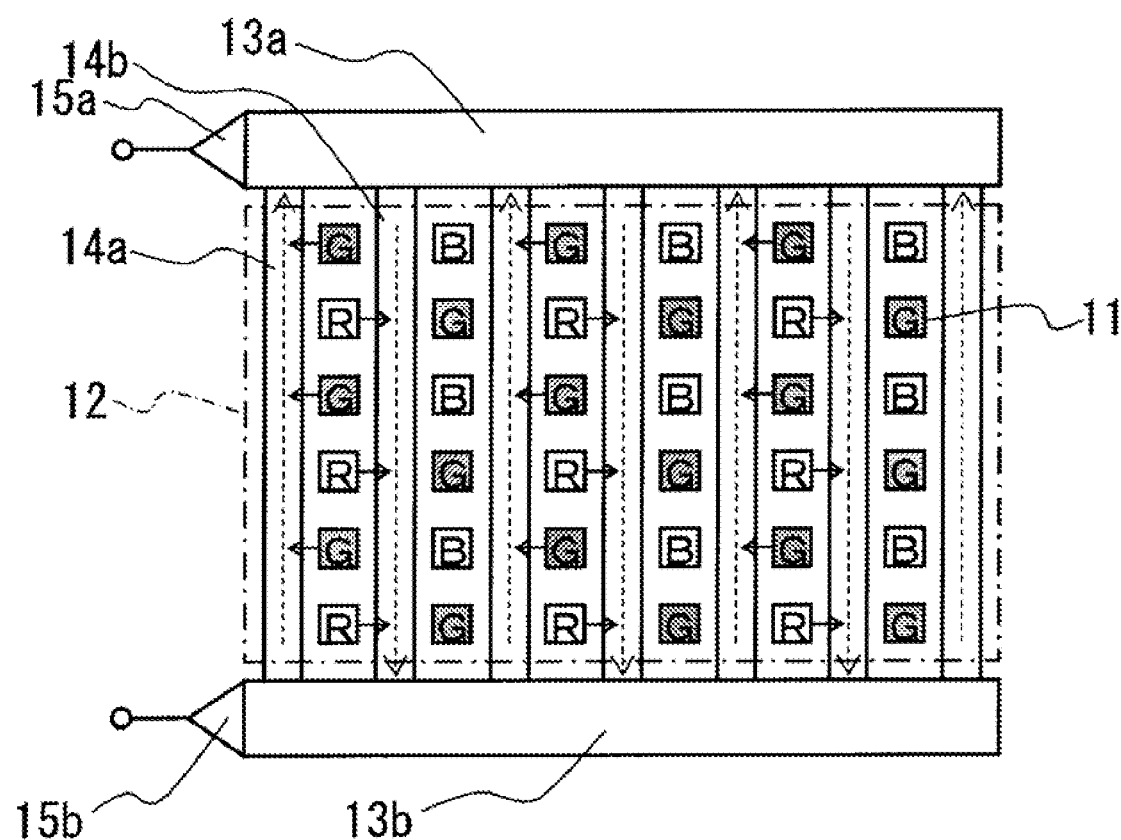
FIG. 5 is a schematic diagram showing a modified version of the solid-state imaging element according to the embodiment of the invention.

In the above description of the embodiment of the present invention, although it is described that the directions of transfer of signal charges in the first horizontal shift register 13a and the second horizontal shift register 13b are opposite to each other, however, it is not limited thereto, and it may be arranged as shown in FIG. 5 so that the first horizontal shift register 13a and the second horizontal shift register 13b transfer their signal charges in the same direction.

Figure 6:
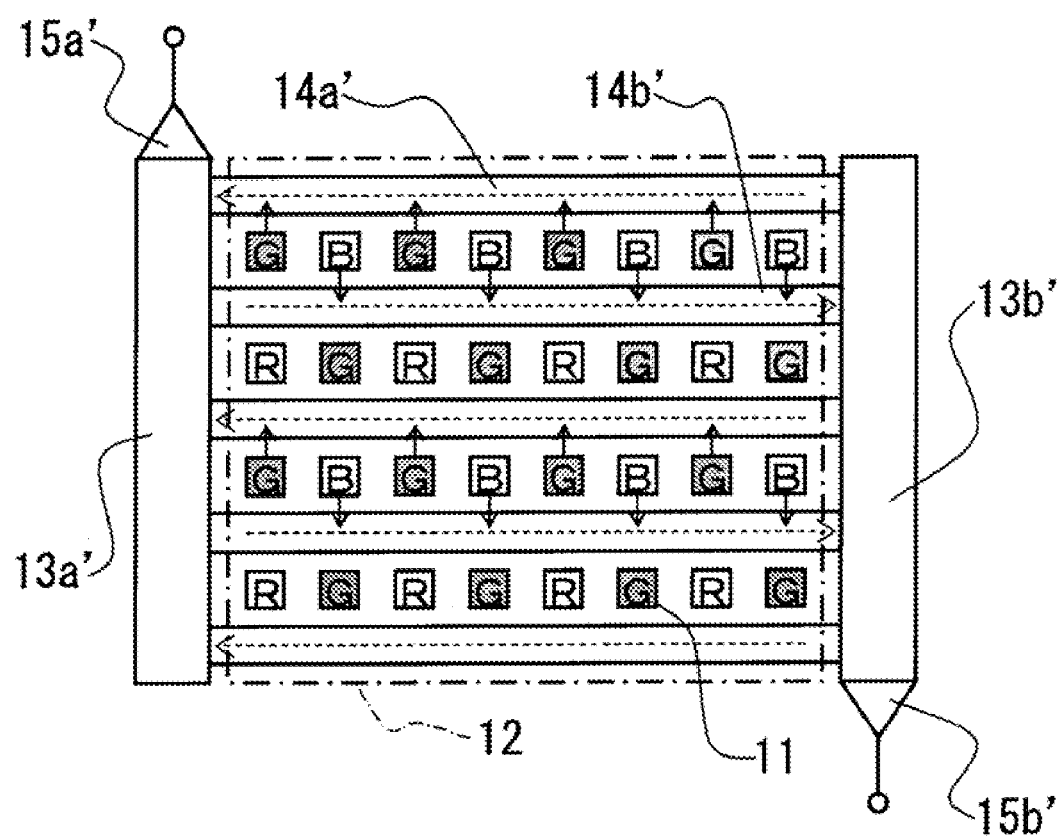
FIG. 6 is a schematic diagram showing another modified version of the solid-state imaging element according to the embodiment of the invention.

Further, in the above description of the embodiment of the present invention, although the first horizontal shift register 13a and the second horizontal shift register 13b are provided parallel to the horizontal directions as shown in FIG. 1, and the first vertical shift register 14a and the second vertical shift register 14*b* are provided parallel to the vertical directions as shown in FIG. 1, it is not limited thereto, and it may be arranged to the same effect so that a first horizontal shift register 13*a'* and a second horizontal shift register 13*b'* are provided parallel to the longitudinal directions with an imaging region 12 interposed therebetween as shown in FIG. 6, as well as a first vertical shift register 14*a'* and a second vertical shift register 14*b'* are provided parallel to the horizontal directions as shown in FIG. 6.

The term "horizontal" in the first horizontal shift register 13*a*, 13*a'* and the second horizontal shift register 13*b*, 13*b'* as well as the term "vertical" in the first vertical shift register 14*a*, 14*a'* and the second vertical shift register 14*b*, 14*b'* are used simply to discriminate between the first horizontal shift register 13*a*, 13*a'* and the second horizontal shift register 13*b*, 13*b'* as well as between the first vertical shift register 14*a*, 14*a'* and the second vertical shift register 14*b*, 14*b'*, thereby not limiting the directions thereof.

Further, the first horizontal shift register 13*a*, 13*a'* and the second horizontal shift register 13*b*, 13*b'* are not limited to two, and any number thereof more than two may be provided as required.

Still further, in the embodiment of the present invention described above, the color filter is described to be a 2 by 2 primary color filter, however, it is not limited to the 2 by 2 primary color filter. In addition to the primary color filter, a complementary color filter using cyan (Cy), yellow (Ye), magenta (Mg) and green (G) may be used as well. Further, the arrangement of the filters is not limited to the 2 by 2, and it may be 2 by 4.

Figure 7A:
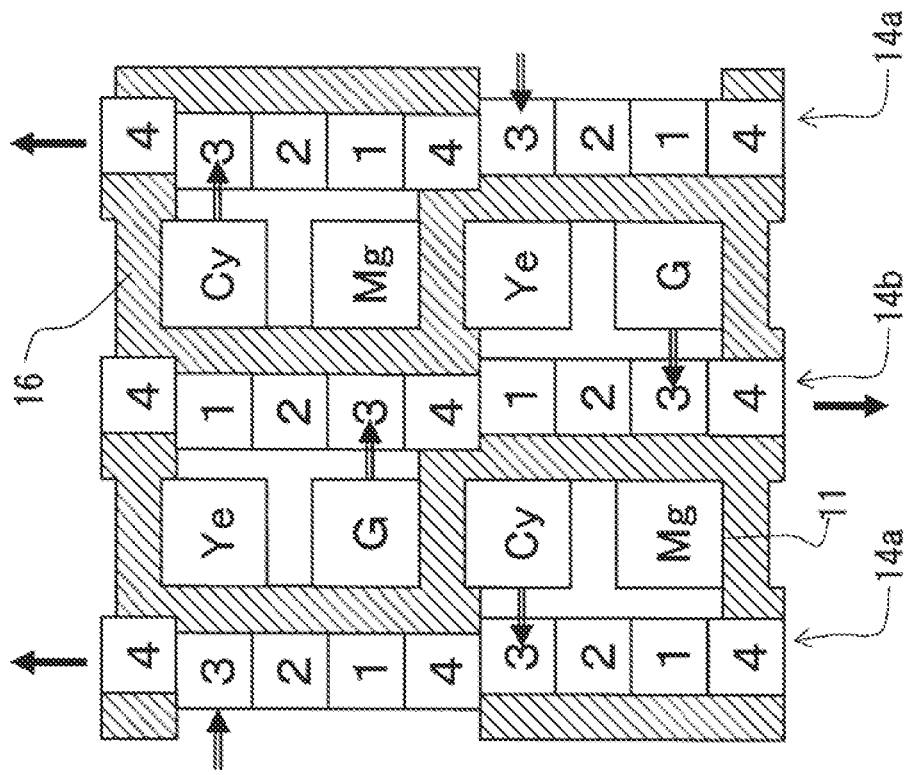
FIGS. 7A and 7B are schematic diagrams showing an example of a 2 by 4 complementary color filter.
Figure 7B:
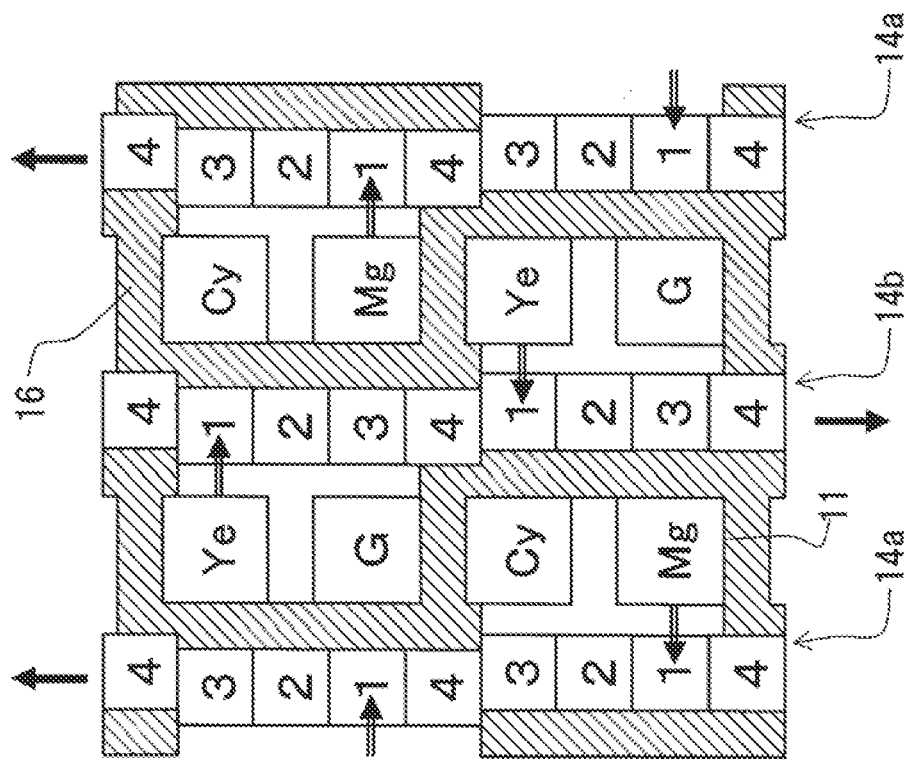

With reference to FIGS. 7A and 7B, when a 2 by 4 complementary color filter is used, readout directions of signal charges to a first vertical shift register 14*a* and a second vertical shift register 14*b* are shown by void arrows, respectively, where FIG. 7A shows a readout condition in a first field while FIG. 7B shows a readout condition in a second field. In the first field, a readout signal is applied to a first electrode 21, and in the second field, a readout signal is applied to a third electrode 23 for reading out a signal charge from a predetermined light receiving element 11.

With reference to FIGS. 8A and 8B, in the case of a modified version of the 2 by 4 complementary color filter of FIGS. 7A and 7B, readout directions of signal charges to a first vertical shift register 14*a* and a second vertical shift register 14*b* are shown by void arrows, where FIG. 8A shows a readout condition in the first field, while FIG. 8B shows a readout condition in the second field.

In the 2 by 4 complementary color filter shown in FIGS. 8A and 8B, arrangements of cyan (Cy) and yellow (Ye) are replaced in part from those in FIGS. 7A and 7B.

Figure 9A:
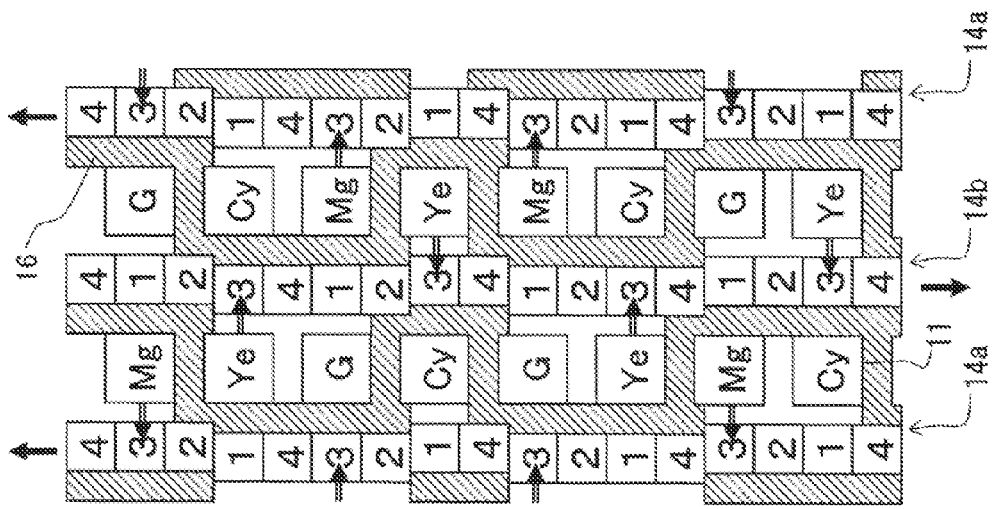
FIGS. 9A and 9B are schematic diagrams showing an example of a 2 by 8 complementary color filter.
Figure 9B:
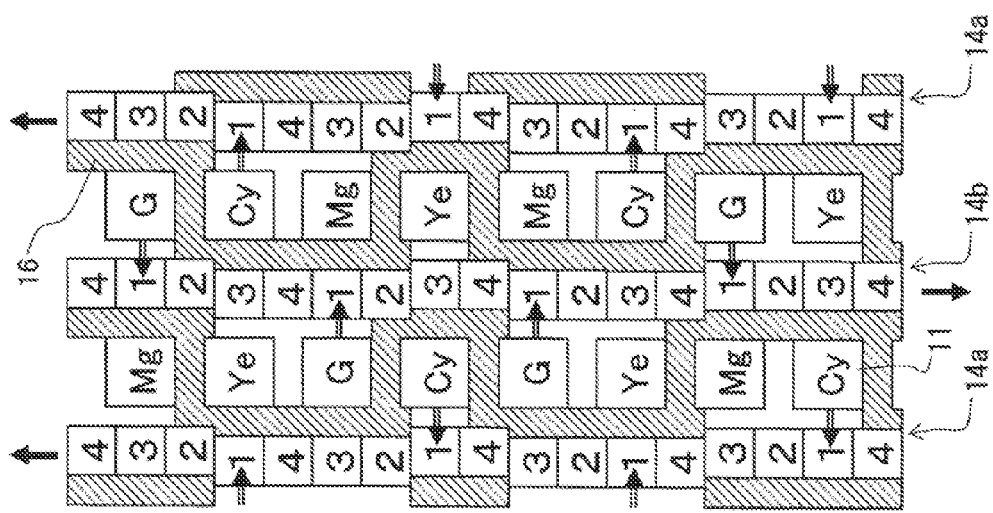
Figure 10:
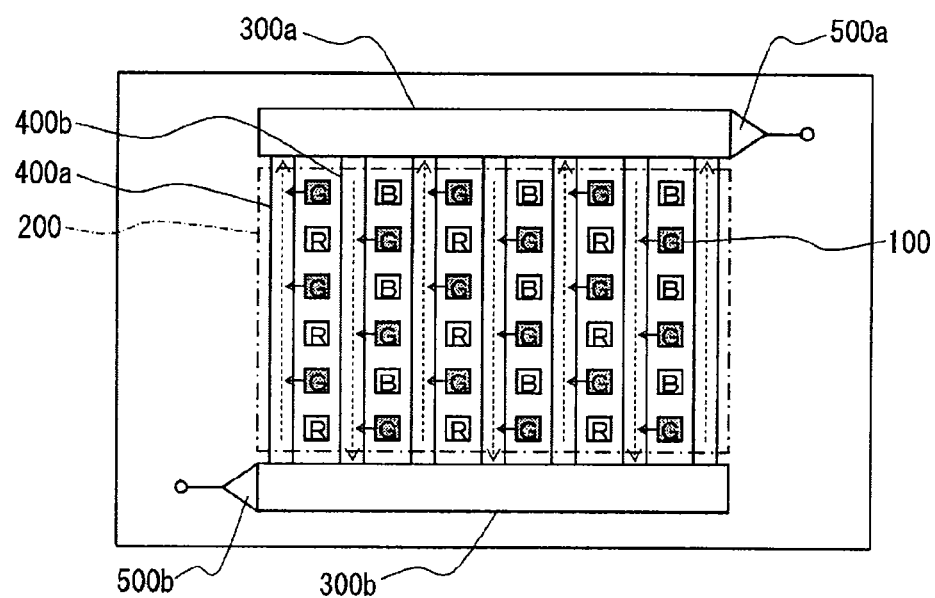
FIG. 10 is a schematic diagram showing a conventional solid-state imaging element.

With reference to FIGS. 9A and 9B, in the case where a 2 by 8 complementary color filter is used, readout directions of signal charges to a first vertical shift register 14*a* and a second vertical shift register 14*b* are shown by void arrows, where FIG. 9A shows a readout condition in the first field while FIG. 9B shows a readout condition in the second field. In the first field, a readout signal is applied to a first electrode 21, and in the second field, a readout signal is applied to a third electrode 23, respectively, to read out a signal charge from a predetermined light receiving element 11.

The present invention contains subject mater related to Japanese Patent Application No. JP2005-281847 filed in the Japanese Patent Office on Sep. 28, 2005, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A solid-state imaging element comprising:
    a plurality of light receiving elements provided within an imaging region on a semiconductor substrate;
    a color filter with a plurality of colors provided on said plurality of light receiving elements for filtering with a predetermined color;
    a first vertical shift register disposed in the imaging region along one side of a row of light receiving elements disposed in a vertical direction, and a second vertical shift register disposed in the imaging region along the other side of the row of light receiving elements;
    a channel stop provided in a staggered pattern on both sides of each of the first and second vertical shift registers; and
    a first horizontal shift register and a second horizontal shift register disposed interposing said imaging region therebetween for transferring a charge transferred from said vertical shift registers and outputting a signal in accordance with said charge, respectively;
    wherein,
    a respective charge of said plurality of light receiving elements accumulated therein in accordance with a light transmitted through filters of the same color in said color filter is transferred exclusively via either one of said first horizontal shift register or said second horizontal shift register to be outputted as said signal, and
    the channel stop is positioned so that light receiving elements, associated with filters of the same color and positioned on adjacent rows, are connected to either one of said first vertical shift register or said second vertical shift register positioned therebetween said adjacent rows.
2. The solid-state imaging element as claimed in claim 1, wherein said color filer comprises a repetitive arrangement of a basic unit in which respective filters of respective colors are disposed in a predetermined pattern, and two or more filters with a same color are provided in said basic unit.
3. The solid-state imaging element as claimed in claim 2, wherein said basic unit is a Bayer array, and said same color is green.
4. A solid-state imaging apparatus provided with a solid-state imaging element, said imaging element comprising:
    a plurality of light receiving elements provided within an imaging region on a semiconductor substrate;
    a color filter with a plurality of colors provided on said plurality of light receiving elements for filtering with a predetermined color;
    a first vertical shift register disposed in the imaging region along one side of a row of light receiving elements disposed in a vertical direction, and a second vertical shift register disposed in the imaging region along the other side of the row of light receiving elements;
    a channel stop provided in a staggered pattern on both sides of each of the first and second vertical shift registers; and
    a first horizontal shift register and a second horizontal shift register disposed interposing said imaging region therebetween for transferring a charge transferred from said vertical shift registers and outputting a signal in accordance with said charge, respectively;
    wherein,
    said solid-state imaging element transfers respective charges of said plurality of light receiving elements accumulated therein in accordance with respective light transmitted through filters of a same color in said color filter exclusively via either said first horizontal shift register or said second horizontal shift register, to output as said signal, and the channel stop is positioned so that light receiving elements, associated with filters of the same color and positioned on adjacent rows, are connected to either one of said first vertical shift register or said second vertical shift register positioned therebetween said adjacent rows.

* * * * *